(No Model.)  
C. L. REDFIELD.  
TYPE WRITING MACHINE.  
3 Sheets—Sheet 1.
No. 481,309.   Patented Aug. 23, 1892.
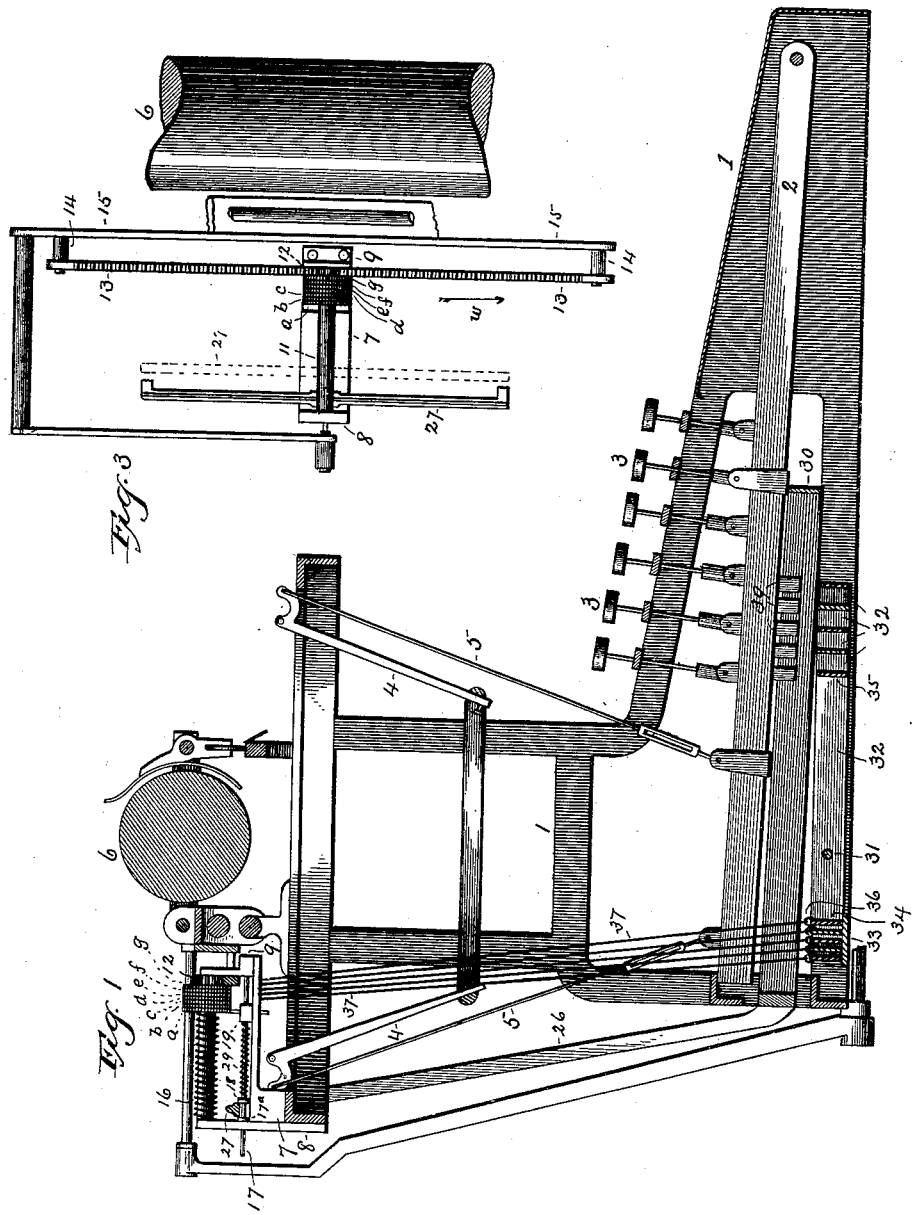
Witnesses  
A. L. Jones  
E. Wurdeman
Inventor  
Casper L. Redfield  
By his Attorney  
P. H. Gunckel (No Model.) 3 Sheets—Sheet 2.
C. L. REDFIELD.
TYPE WRITING MACHINE.
No. 481,309. Patented Aug. 23, 1892.
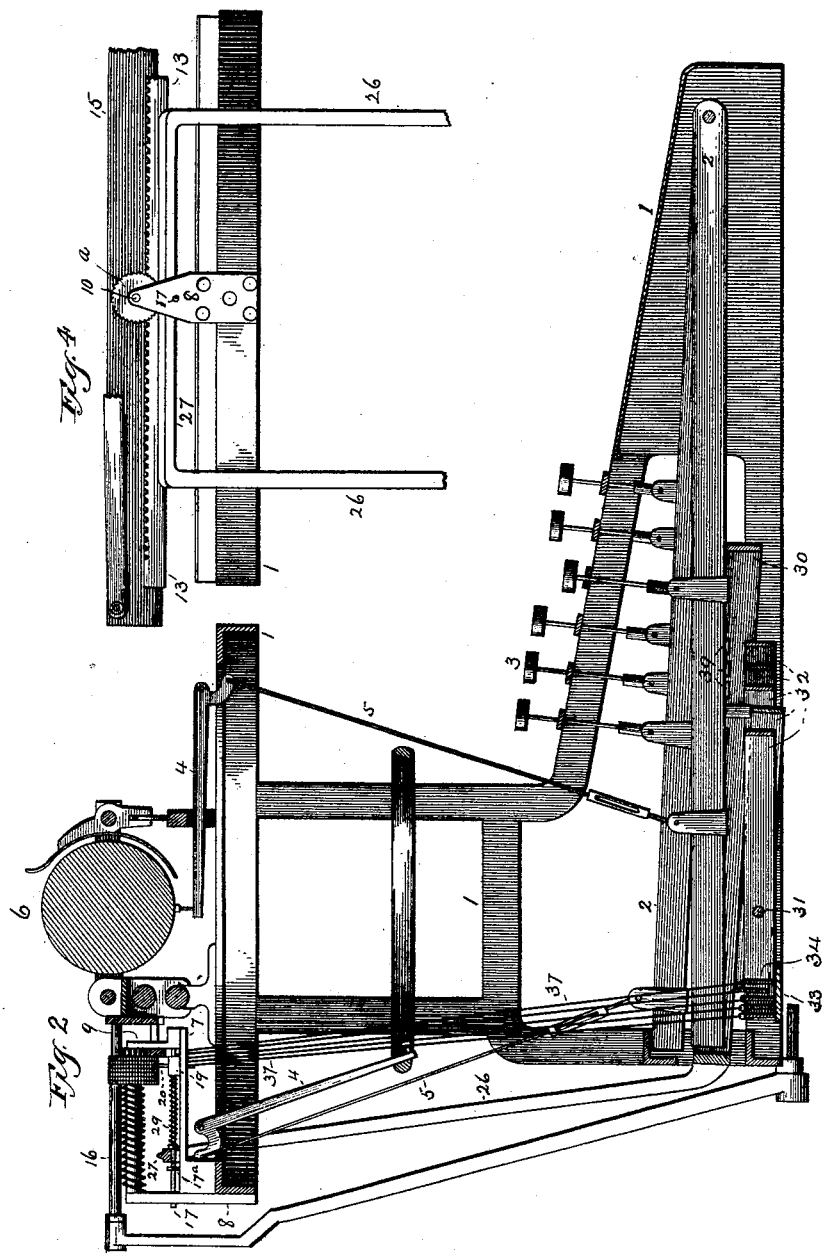

(No Model.) 3 Sheets—Sheet 3.
C. L. REDFIELD.
TYPE WRITING MACHINE.
No. 481,309. Patented Aug. 23, 1892.
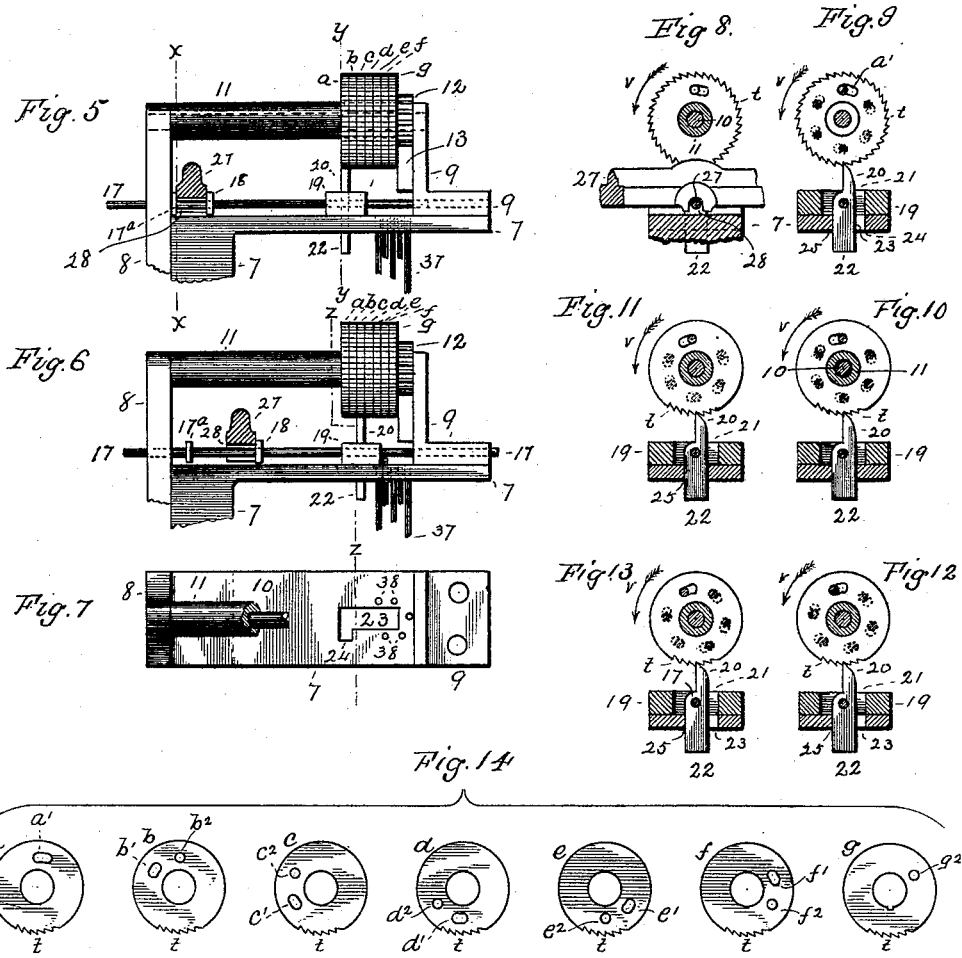
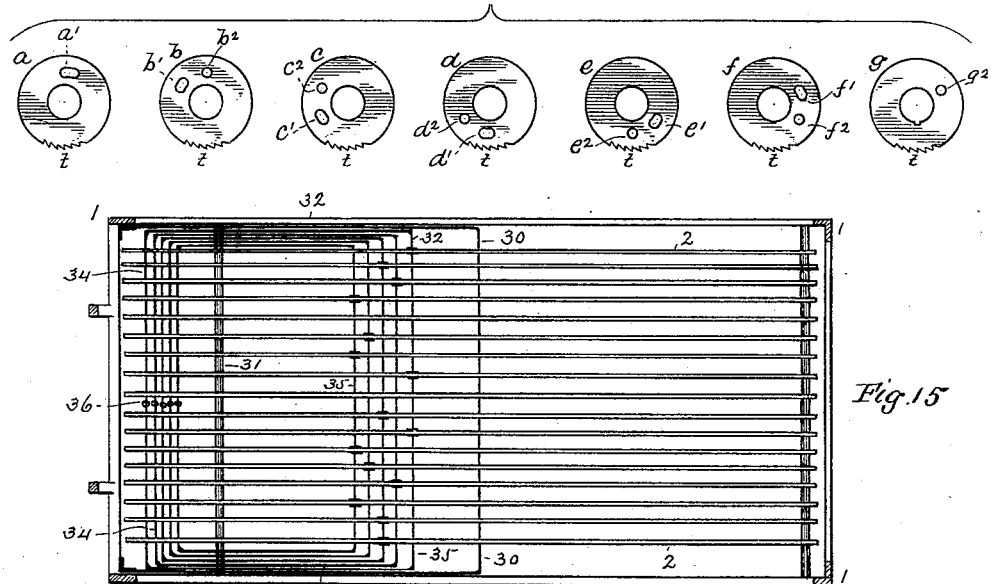
Witnesses
A. L. Jones.
O. H. Wurdeman
Inventor
Casper L. Redfield
By his Attorney
P. H. Gunckel

UNITED STATES PATENT OFFICE.

CASPER L. REDFIELD, OF CHICAGO, ILLINOIS, ASSIGNOR TO THE CHICAGO MATRIX MACHINE COMPANY.

TYPE-WRITING MACHINE.

SPECIFICATION forming part of Letters Patent No. 481,309, dated August 23, 1892.

Application filed September 16, 1890. Serial No. 365,175. (No model.)

*To all whom it may concern:*

Be it known that I, CASPER L. REDFIELD, a citizen of the United States, residing at Chicago, in the county of Cook and State of Illinois, have invented certain new and useful Improvements in Variable Feed for Type-Writing Machines, of which the following is a specification.

My invention relates to devices for varying the feed of type-writers proportionately to the difference in the space required by the various characters imprinted.

The primary object of this invention is the preparation of suitable copy for reproducing the same printed matter by the operation of a matrix-machine, the matrix to show the matter properly justified and each character occupying the proper proportionate space. Stated more specifically the end in view is to provide a type-writer with a variable-feed movement having a constant ratio to the feed movement of the matrix-machine for which the type-writer print is to serve as copy, so that a line of matter printed on the type-writer will show by the space it occupies how much space it will occupy in the matrix, and hence show the amount of extra spaces necessary to be thrown in between words to make the line justify as in lines of ordinary book or newspaper print. In the type-writers in common use the feed movements are limited to two or three different degrees and the justification of matter for a matrix-machine has usually been done by using a type-writer having a uniform feed and attaching to it a separate indexing device which will show the proper differential spacing of the equally-spaced characters printed by the type-writer.

The letters and other characters in a matrix-machine are usually divided into five or six classes, according to the space they occupy in print. In the classification the letter "i" may be taken as the representative of the class requiring the least space, and in a system of type-cutting using five or six different degrees of space for the different characters it will occupy two units of space, (other characters of the same class being "fl," the punctuation-marks, &c.) The letter "I" will represent the characters requiring three units of space, (others of the same group being "e," "s," "t," &c.) The letter "a" will represent the group occupying four units, the letter "A" the group requiring five units, the letter "m" that requiring six units, and "M" that requiring seven units. The characters occupying seven units of space are sometimes condensed and classed with those requiring only six units, thus doing away with a seven-unit-feed movement in the matrix-machine. The seven-unit feed is, however, retained in the drawings and description of this application.

For the purposes of this application two units of space are assumed as the space between words. It is obvious, however, that any other space may be chosen as the ordinary or minimum space. Hence a two-unit movement is the shortest movement necessary and the shortest provided for by the devices shown in the drawings. The type for the type-writer should be cut upon a scale of measurement that will give their characters the same number of units as the corresponding characters in the matrix-machine; but the established unit need not be of the same length in the two machines.

My improvements are illustrated in the accompanying drawings, in which—

Figure 1 is a longitudinal section of an ordinary Caligraph type-writer, showing my improvements in position. Fig. 2 is a similar section illustrating the manner in which the devices of the improvement operate. Fig. 3 is a plan view of the escapement and a portion of the type-writer. Fig. 4 is a rear view of the same. Fig. 5 is an enlarged elevation of the escapement devices detached. Fig. 6 is a similar view showing the operating-pawl moved to the third ratchet-wheel. Fig. 7 is a plan of the supporting-bracket, showing the position of the stop-pins. Fig. 8 is a section on the line $x\,x$ of Fig. 5. Fig. 9 is a section on the line $y\,y$ of Fig. 5. Fig. 10 is a similar section showing the pawl moved to the second wheel from the position shown in Figs. 5 and 9; Fig. 11, a like section on the line $z\,z$ of Fig. 6, showing the pawl moved to the third wheel from the position shown in Figs. 5 and 9. Fig. 12 shows the pawl moved back to the first wheel after having moved to the second. Fig. 13 shows it moved back to the first wheel after having been moved to the third. (The Figs. 9 to 13 show the positions of the wheels and their slots and pins relative to one another as a result of moving the pawl.) Fig. 14 shows the seven ratchet-wheels separately and the relative positions of their slots and pins, and Fig. 15 is a horizontal section of the machine, illustrating the arrangement of the operating-levers.

In the several views, 1 designates the frame; 2, the pivoted levers operated by the hand-keys 3; 4, the type-levers connected to the former levers by rods 5, and 6, the cylindrical platen of the common Caligraph type-writer. The arm that is usually provided in that machine for carrying the feed devices is, in this instance, omitted, and in place is substituted a bracket 7 and a standard 8 at the extreme rear of the machine. On the inner end of this bracket is fastened a second bracket 9, rising to the same height as the standard 8, and mounted on these is a fixed horizontal shaft 10, on which is a loose sleeve 11. On the inner end of the sleeve is a gear 12, which engages a rack 13, held by posts 14 on the piece 15, which ordinarily constitutes the fixed toothed rack in said type-writing machine. Adjacent to the gear-wheel 12 are seven flat wheels or disks, designated $a$, $b$, $c$, $d$, $e$, $f$, and $g$, respectively, that are held in frictional contact with one another by a spiral spring 16 on the sleeve 11. All of them have ratchet-teeth $t$ on their rims or on portions of their rims. The first six wheels have oblong slots $a'$, $b'$, $c'$, $d'$, $e'$, and $f'$, respectively, and the last six have pins $b^2$, $c^2$, $d^2$, $e^2$, $f^2$, and $g^2$ on their respective faces that enter the slots. The wheel $g$ is fixed to the sleeve 11, while the others are loose on it and are free to turn as far as the length of the slots $a'$ $b'$, &c., and the pins $b^2 c^2$, &c., will permit. The rack 13 has a usual tension to move it in the direction of the arrow $w$, (shown in Fig. 3,) and hence to turn the ratchet-wheel $a$ $b$, &c., in the direction of the arrows $v$. (Shown in Figs. 8 to 13.) The spring 16 has one end fastened to the sleeve 11 and the other to the wheel $a$, and, in addition to keeping the several wheels pressed together, has a slight tension to turn them on the sleeve in the same direction as the movement of the wheel $g$, that is fixed to the sleeve 11.

A shaft or rod 17 passes through the standard 8 and bracket 9 slightly above the bracket 7, and on it is a fixed collar 17ª and a loose collar 18. In advance of these on the rod is a frame 19 and a pawl 20, one of which (preferably the frame) is fast to and the other loose on the rod. The frame 19 is cut out, as shown at 21 in Figs. 8 to 13, to permit the pawl to swing on the rod, while both the frame and pawl are made to advance and retreat with the rod in its reciprocations. The pawl has a pendent body 22, which by gravitation keeps it in vertical position, and the bracket 7 has a slot 23 to accommodate this pendent portion, while the pawl is operating and a recess 24 lateral to the slot for the pendent body 22 to enter when the pawl is swung back out of engagement with the ratchets to permit the retraction of the paper-carriage. The edge 25 of the slot 23 constitutes a backing for the pendent portion of the pawl to enable it to resist the force of the ratchet-wheels it engages.

The arm 26, that serves to reciprocate the rod 17 and move the pawl 20, extends upward in rear of the machine in two branches, between which is a cross-bar 27, having a slot 28, through which passes the portion of the rod 17 intermediate the collars 17ª and 18. A spring 29 on the rod 17 intermediate the loose collar 18 and the frame 19 serves to push the frame and the pawl to the right when the arm 26 moves in that direction, and if the frame is stopped before the movement of the arm 26 is completed the spring is adapted to be compressed to accommodate for the stoppage. The arm or lever 26 has the usual bail 30 extending transversely under the key-levers, and is thereby operated by them in the usual manner.

A shaft 31 extends across the lower portion of the machine, on which are hung five bails 32, which form rectangles one within another. The rear cross-bars 34 of these bails are supported on a cross-piece 33, on which they rest, because these ends are heavier than the front ends or cross-bars 35. At the middle of the cross-bars 34 are eyes or links 36, to which rods 37 are connected, that extend upward through the machine and into the holes 38 in the bracket 7 to serve as stops for the reciprocating frame 19.

On the key-levers 2 are secured a series of clips 39, that when depressed serve to tilt the levers 32 on their pivoting-shaft and lift the upper ends of the rods 37 through the holes 38 in the bracket 7 and into the path of the frame 19 when the latter is moving toward the right.

The wheels $a$ $b$ $c$, &c., have their respective slots and pins so arranged that when the pins are all at either extreme of their movement the teeth of all of the wheels will coincide as though they were the successive teeth of a single wheel having a rim equal to the combined rims of the several wheels. The slot $a'$ in the wheel $a$ is of a length that will permit that wheel to rotate on the wheel $b$ a distance equal to the two teeth, and each of the other slots $b'$ $c'$, &c., is of such length as to permit the wheel it is in to rotate on the adjacent wheel a distance equal to one tooth.

The operation of the mechanism is as follows: The operator in striking one of the finger-keys depresses the corresponding key-lever 2, which by coming in contact with the bail 30 depresses it and causes the arm 26 to move toward the right and carry with it the frame 19 and pawl 20, so as to move the pawl from one ratchet-wheel ($a$ $b$, &c.) to the next in line with their axes. The same depression of the key-lever causes its clip 39 to engage and tilt the appropriate bail 32 and thus lift the end of its rod 27 into the path of the frame 19, so as to stop the pawl 20 in position to engage the desired wheel of the series *a b*, &c. The manner in which these ratchet-wheels operate to permit variable-feed movements is illustrated in Figs. 9 to 13, in which are shown in dotted lines the relative positions of the slots and pins due to the movements of the pawl, the pins being section-lined to more clearly show them. In Fig. 9 the pawl is supposed to be in engagement with the wheel *a*, and the tension given by the rack 13 to the gear 12 serves to force the pins to the extreme forward ends of the slots in which they engage. Sliding the pawl out of engagement with the wheel *a* to engagement with the wheel *b* does not disturb the positions of the wheels *b* to *g* or the gear 12; but it permits the spring 16 to rotate the wheel *a* in the direction of the arrow *v* the space of two teeth, which movement is permitted by the fact that the length of the slot *a'* is that much greater than the diameter of the pin. Sliding the pawl back from the wheel *b* to the wheel *a* does not disturb the position that this latter wheel assumed when permitted to advance, but it releases the wheel *b* and permits it and the mechanism between it and the paper-carriage to advance until the pin $b^2$ is at the same end of the slot *a'* as it originally was, this position being shown in Fig. 12. If in moving the pawl from the wheel *a*, as shown in Figs. 5 to 9, it is not stopped at the wheel *b*, but is permitted to move to the wheel *c*, as shown in Fig. 6, the spring 16 will first advance the wheel *a* on the wheel *b* the distance of two teeth, and then both the wheels *a* and *b* will rotate on the wheel *c* the distance of one tooth. Returning the pawl to the wheel *a* permits the rest of the wheels to advance the space of three teeth. These positions are shown, respectively, in Figs. 11 and 14. So in moving the pawl to engage any other wheel the extent of movement is determined by the wheel which the pawl engages when it is stopped. The pins 37 serve to stop the pawl at wheels *b*, *c*, *d*, *e*, and *f*, while the bracket 9 serves to stop it at the wheel *g*. It is obvious that an increased extent of feed movements may be had by using a larger number of ratchet-wheels, and any degree of fineness of movement may be had without making the ratchet-teeth too fine by making the ratchet-teeth numerous and increasing the ratchet-wheel diameter as compared to the gear-diameter.

The method of using this device for justifying printing is as follows: Suppose the required length of line to be printed on the matrix-machine is to occupy one hundred and thirty units of space, these units of space being also those on which the letters are cut. A type-writer having its units of a different length, but having the same number of units for corresponding letters, is used to prepare a copy. This copy is made on a sheet of paper having width enough to accommodate conveniently one hundred and thirty-two units of space of the size used on the type-writer. The matter is printed on the type-writer so that each line ends at the end of some word or syllable which has a position a small number of units of space short of the required line of one hundred and thirty-two units. This amount of short space, which is read from the ordinary scale in front of the machine (the scale having its graduations the same as the units of space used in the letters of the type-writer) is printed in figures at the end of the line, and the next word or syllable is carried forward to the following line, and the operation is thus continued until the whole of the matter is prepared as copy for the matrix-machine. In addition to having all the characters of the type-writer the matrix-machine has means for making any degree of space between words from one to seven units, the normal space being two units, as on the type-writer. The copy from the type-writer therefore not only contains the matter to be printed on the matrix-machine, but also indicates exactly how much extra space is required to make each line justify, and the operator of the matrix-machine readily distributes this space between the words as they are being printed.

What I claim is—

1. A variable-feed mechanism comprising a series of ratchet-wheels on a common axis, each wheel being capable of limited rotation independent of the others, a spring holding them in frictional contact and tending to rotate them, a gear connected to the last wheel of the series, and a rack engaged thereby.

2. In a variable-feed mechanism, a rack and gear under tension, a fixed shaft and a sleeve thereon to which the gear is fast, a series of ratchet-wheels carried by the sleeve and connected to the gear and to one another by devices permitting each wheel partial rotation independent of the others, a motor-spring on the sleeve tending to hold the wheels in frictional contact and to rotate them in the same direction as the rack-tension, a pawl engaging the wheels, and means for shifting it from one wheel to another to vary the feed, substantially as set forth.

3. An escapement mechanism comprising a rack under tension, a gear meshing therewith, a series of ratchet-wheels loosely held on the shaft of the gear and having slots and pins, permitting partial rotation of each wheel relative to the next, a spring on the same shaft tending to hold the wheels in contact and to rotate them in the same direction as the rack-tension, a dog for holding the wheels, and means for shifting it from one wheel to another.

4. In a variable-feed mechanism, a rack under tension, a gear in mesh therewith, a series of ratchet-wheels loosely held on the axis of the gear, one of them being fast to the axis, means for permitting the partial rotation of each of the wheels independently of the others, a motor-spring tending to hold the wheels of the series in frictional contact and to turn them in the same direction as the rack-tension, and a shifting detent for engaging the wheels, substantially as set forth.

5. A variable-feed escapement comprising a rack and gear under tension, a series of ratchet-wheels having coinciding teeth, one of said wheels being fast to the axis of the gear and the others loose thereon, a spring having a tension to move the loose wheels toward the fast one and to turn them in the same direction as the gear-tension, and a movable detent for successively engaging different wheels of the series, substantially as set forth.

6. In a typographic machine having the faces of its type multiples of a selected space-unit, a feed mechanism for producing feed movements proportioned to the requirements of such type and comprising a series of ratchet-wheels, one of which is attached to an axis and the others loose on the same axis and having suitable slots and pins for connecting them to permit partial independent rotations, a motor for turning the axis, a motor-spring of less force tending to turn the wheels in the same direction and to hold them in frictional contact, and means for stopping any wheel of the series to permit partial rotation of other wheels between it and said motor-spring, whereby variable-feed movements are caused to follow the release of the engaged wheel.

7. A variable-feed mechanism comprising a series of ratchet-wheels, one of which is attached to an axis and the others loose on the same axis and having suitable slots and pins for connecting them to permit partial independent rotations, a motor for turning the axis, a motor-spring of less force tending to turn the wheels in the same direction and to hold them in frictional contact, and means for stopping any wheel of the series to permit partial rotation of other wheels between it and said motor-spring, whereby variable-feed movements are caused to follow the release of the engaged wheel.

8. A variable-feed mechanism comprising a series of toothed wheels and a gear on a common axis, a motor tending to turn the gear and its sxis, a spring holding the wheels in frictional contact and tending to turn them in the direction of the gear movement, connections between the wheels permitting them to rotate with respect to one another limited distances, a movable pawl, and means for shifting it to engagement with any one of the series of wheels to vary the feed movements.

9. In a variable-feed mechanism, a rack and pinion under tension, a series of co-operating ratchet-wheels, all but one of which are loose on the axis of the pinion and under tension of a spring to hold them in frictional contact and to turn them in the same direction as the pinion movement, connections between them for limiting the extent of rotation, and a shifting device for engaging the teeth of a selected wheel to determine the aggregate rotations and resultant feed movements.

10. In a variable-feed mechanism, a series of co-operating ratchet-wheels, an axis on which one of them is fast and on which all others are loose, a spring holding them in frictional contact and tending to rotate them, connections between them for limiting their independent rotations, and a shifting pawl for selecting and holding any wheel of the series to permit others to rotate to determine the aggregate advance movement.

11. In a variable-feed mechanism, a rack, a gear, a ratchet-wheel movable with the gear, a series of other ratchet-wheels loose on the gear-axis, a spring on said axis holding the wheels in frictional contact with one another and tending to turn them independently of the gear-tension, but in the same direction, and a shifting device for holding any selected wheel of the series to permit others to rotate, substantially as set forth.

12. The combination, with a rack and gear under tension for forward movement, of a series of co-operating ratchet-wheels, one of which is fast to and the others loose on the gear-axis, a spring holding the wheels in frictional contact and tending to turn them, a pawl adapted to engage the wheels successively, a guided sliding carrier for the pawl, means for sliding the carrier, a series of stops, and means for projecting them separately into the path of the carrier to limit its movement and determine the resultant feed movement, substantially as set forth.

13. In a variable-feed mechanism, a rack, a gear, a series of ratchet-wheels on the gear-axis, the wheel next the gear being fast and the others loose on the axis, a motor for moving the rack and gear, and an independent spring for holding the wheels in frictional contact and turning them in the same direction, slots and pins in the wheels for limiting rotations with respect to one another, a pawl co-operating with the wheels, a lever for moving it from wheel to wheel, stops for limiting its travel, and key-levers and connections for controlling said pawl-operating lever and said stops, for the purpose set forth.

14. The combination, with a rack and gear under tension for forward movement, of a series of co-operating ratchet-wheels, one of which is fast to and the others loose on the gear-axis, a spring holding the wheels in frictional contact and tending to turn them, a pawl adapted to engage the wheels successively, a guided sliding carrier for the pawl, a lever for operating it, a series of bails carrying rods and adapted to tilt independently to project their respective rods into the path of the pawl-carrier to stop it, and key-levers arranged to operate said lever for actuating the pawl-carrier and to tilt said bails, substantially as set forth.

CASPER L. REDFIELD.

Witnesses:
GEORGE P. JONES,
GRAHAM P. JONES.